United States Patent Office
3,248,377
Patented Apr. 26, 1966

3,248,377
STYRENE POLYMERIZATION PROCESS
Vernon W. Arnold, Hammond, and Gert H. Weisemann, Hobart, Ind., assignors to Standard Oil Company, Chicago, Ill., a corporation of Indiana
No Drawing. Filed Dec. 22, 1960, Ser. No. 77,520
5 Claims. (Cl. 260—93.5)

This invention relates to an improved process for the production of polystyrenes wherein styrene is polymerized from a solution thereof in an aromatic hydrocarbon solvent with a catalytic amount of dispersed sodium and a dihydric alcohol-dialkylether promoter. More specifically, the invention pertains to the provision of an improved solution polymerization process using the aforementioned catalyst and to the solution of problems in carrying forward bench scale laboratory tests to commercial production.

It has been demonstrated in laboratory tests that styrene in aromatic hydrocarbon solution can be polymerized by means of anionic catalysts such as sodium to a commercially useful polymeric product having specific viscosity in the range 0.7 to 1.4 and that the polymer yield and reaction rate can be enormously increased by using purified charge materials and employing a dihydric alcohol-dialkylether promoter such as dimethoxyethane. In batch laboratory tests, polymerization on a small scale is effective in reaction flasks provided with reflux condensers having high cooling surfaces per volume of reactant, and polymerization temperature is ordinarily controlled by effecting reaction at the boiling point of the reaction mixture and dissipating heat of reaction by refluxing solvent and/or reactant. An object of this invention is to provide certain improvements in the known processes for polymerization of styrene in solution by means of promoted anionic catalysts. A further object is to provide an improved method for effecting the polymerization reaction at isothermal or near isothermal conditions. Another object is to provide a method and means for obtaining maximum yields of high quality product at maximum flexibility of operation. Other objects will be apparent as the detailed description of the invention proceeds.

Briefly, the invention contemplates the use of styrene which is substantially free of moisture, oxides of carbon, or other impurities capable of reacting with metallic sodium. The solvent is preferably a purified xylene stream, e.g., such as obtained by Udex extraction of the $C_8$ aromatic fraction from petroleum reforming processes, which is dried to less than 50 p.p.m. of water. In one aspect of the invention, a solution of styrene obtained by dehydrogenation of a $C_8$ aromatic stream consisting of ethylbenzene dissolved in mixed isomeric xylenes, for example, as described and claimed in U.S. Patent No. 2,813,137 of W. W. Twaddle et al., may be advantageously employed. The polymerization catalyst is a dispersion of an alkali metal, preferably sodium in an inert liquid, e.g., xylene which is introduced into the reactor in an amount between about 0.1 and 1.0 weight percent based on introduced styrene. The preferred promotor is dimethoxyethane which is introduced into the reactor in an amount between about 10% and 100 weight percent based on the weight of alkali metal catalyst.

The polymerization reaction is effected in a stirred reactor operating at sub-atmospheric pressure, typically 50 to 150 mm. Hg absolute and at a temperature between about 50° and 100° C. It will be realized that temperature and pressure are interrelated variables, the pressure being adjusted within the indicated range to effect refluxing of the reaction mixture at the selected polymerization temperature. Vacuum refluxing is essential in order to remove the heat of reaction since the polymerization of styrene in accordance with the process is highly exothermic, and depending upon the particular catalyst and promoter concentrations and styrene concentration in the reaction mixture, can even attain explosive violence.

Because of the highly exothermic nature of the reaction, we have found that the polymerization reaction is most efficiently and economically conducted in at least two steps, in each of which an increment of styrene monomer is polymerized in solution in xylene. In the first step, a polymerizate consisting of from 10–20% styrene in xylene, preferably about 15%, is treated with catalyst and promoter to effect polymerization of 95% or more of the styrene charged. In the second step, an additional increment of styrene is added to the reaction mixture first formed together with additional catalyst and promoter, if desired, and polymerization of the second increment then effected. By conducting the polymerization in this manner, effective removal of the heat of polymerization is attained, and the reaction effected under essentially isothermal conditions. An added advantage of such operation in addition to the element of safety provided, is the obtention of a polymer product of more uniform molecular weight, and containing a lesser proportion of undesirable low molecular weight polymer which adversely affects the ultimate properties of the polystyrene product or products made therefrom, such as high-impact polystyrene compositions. Further increments of styrene can be added and polymerized in the polymer containing solution to attain polymer solution having up to 50% by weight polymer, affording the advantage of reduced heat and cost requirements of vacuum extruders and the like for removal of solvent from the desired polymer product.

In effecting the first stage polymerization of styrene, xylene containing a small amount of styrene is vaporized and condensed for recycle to the polymerization reaction. We have found that even though pure and dry materials are employed in the reaction, a minor amount of connate impurities possibly including traces of moisture, are invariably carried over by the refluxing xylene to the condenser, and that continuous recycle of the overhead condensate to the polymerization reactor results in inhibition of the polymerization and unduly long induction periods for the polymerization of the second and subsequent increments of styrene. In a preferred method of operation, we condense and store the vaporized solvent obtained in both stages of the reaction, and recycle this to subsequent polymerization batches. In this manner, traces of impurities which accumulate in the vaporized solvent do not interfere with polymerization and the necessity for special treatment of the overhead distillate is obviated, providing marked economic advantages.

The process of our invention is particularly well suited to the polymerization of styrene obtained by the dehydrogenation of ethylbenzene in solution in isomeric xylenes, for example dehydrogenation effluents obtained by the process described in U.S.P. 2,813,137. Such solutions contain about 25–30% styrene, and polymerization of such high concentrations of styrene result in uncontrollable reaction rates due to the tremendous heat of reaction. We have successfully polymerized such solutions of styrene under controllable conditions by providing a polymer-solvent solution of approximately 25% polystyrene in xylene, prepared for example by the two-step multibatch addition process previously described. Then about 50 to 70%, preferably about 60% of the reactor contents are removed and replaced with an equal weight of 25% styrene dissolved in $C_8$ isomeric hydrocarbons to give a charge comprising about 75% aromatic solvent, 10% polystyrene and 15% monomeric styrene.

Polymerization is then readily effected under vacuum reflux conditions and the temperature of the reaction readily controlled by dissipating heat of reaction by cooling the refluxing solvent vapors.

The reaction product obtained by the multiple stage polymerization of styrene contains free metallic sodium in suspension and chemically combined sodium. The free sodium is removed by filtration and the chemically combined sodium converted to sodium bicarbonate by reaction with moist $CO_2$. The product flows to polymer blend tanks where reaction batches are blended to compensate for minor variations in intrinsic viscosity of the product. Internal lubricants and/or stabilizers, etc. are blended with the polystyrene solution which is then flashed to about 70 weight percent polymer. This polymer concentrate then passes to a vacuum extruder where complete removal of residual solvent occurs. The extruded strands leaving the vacuum extruder pass through a cooling bath, and then are chopped, pelleted or otherwise processed for provision of a final polystyrene product. General purpose polystyrene so prepared contains a maximum of 0.5 weight percent volatiles.

Xylenes recovered from the devolatilization section are purified and recovered by distillation and treatment over activated alumina for decreasing the water content preferably to not more than 50 parts per million.

The invention will be more clearly understood from the following detailed description of preferred examples, but it should be understood that these examples serve to illustrate specific conditions and results which may be obtained by the practice of the invention, and are not to be interpreted as limiting the scope thereof.

*Example 1*

In order to provide a basis for comparison with runs employing the improved techniques for styrene polymerization herein disclosed, a solution of 25 weight percent styrene in mixed xylenes was polymerized in a steel reactor of about 15 gallons capacity. The reactor was equipped with a stirrer and reflux condenser, and provided with means for heating to the desired temperature. The outlet end of the reflux condenser led to a vacuum pump by means of which the pressure in the reactor could be controlled.

In this example, ten gallons of 25 weight percent styrene solution was charged to the reactor and heated to 75° C. The pressure in the reactor was then adjusted to permit gentle boiling of the reactor charge, and the catalyst consisting of 0.20 weight percent sodium (in the form of a 50 weight percent dispersion in xylene) and 0.1 weight percent dimethoxyethane (weight percent of catalyst components based on weight styrene) introduced into the reactor. An induction period of 3.5 minutes was followed by vigorous evolution of heat and violent refluxing of the reactor contents. Despite the cooling afforded by refluxing solvent and styrene, the reaction temperature rapidly rose to 120° C., then gradually dropped back over a half-hour period to 80° C. At this time, the reactor contents were filtered to remove solid sodium particles, and the filtrate treated with moist $CO_2$ gas and finally filtered through a Sparkler filter. The polymer was recovered by vacuum extrusion of the polystrene solution and had an intrinsic viscosity of 0.91 and APHA color of 8. Conversion of styrene to polymer was 96.8%.

*Example 2*

Employing the same reactor as described in Example 1, and maintaining the same rate of flow of cooling water through the reflux condenser, 8.1 gallons of a 15 weight percent styrene solution in mixed xylenes was charged to the reactor and heated to 75° C. Reaction was initiated under reflux conditions by addition of 0.3 weight percent sodium and 0.5 weight percent dimethoxyethane (based on styrene). An induction period of 1.75 minutes was followed by vigorous reaction, but under the same conditions employed in Example 1, the maximum temperature of the reactor contents was 81° C., indicating good control of polymerization conditions when the 15% styrene solution was polymerized. After ten minutes, 1.2 gallons of fresh styrene was added to the reactor together with 0.2 weight percent dispersed sodium and 0.1 weight percent dimethoxyethane (based on added styrene). Reaction began immediately, but the maximum temperature reached was 79° C. After another ten-minute period, a second charge of 1.2 gallons of styrene, together with 0.1 weight percent sodium and 0.05 weight percent dimethoxyethane was added, and again vigorous polymerization ensued after a 3.5 minute induction period. The maximum temperature reached during this polymerization period was 80° C.

The polymerization product was worked up as before yielding a polymer of 0.70 intrinsic viscosity and greatly improved color. Overall styrene conversion to polymer was about 98%. Final polymer concentration in the reaction solution was 34.3 weight percent, indicating that a high concentration of polymer can be obtained by the multiple-polymerization technique while affording the benefits of readily controlled polymerization.

*Example 3*

Following the procedure of Example 2, solutions of styrene in mixed $C_8$ aromatic solvent (20.3% ethylbenzene, 0.5% toluene, 23.0% ortho-xylene, 38.9% meta-xylene and 17.3% para-xylene) were polymerized by multiple-stage addition. In each run, polymerization was effected with 0.2 weight percent sodium and 0.1 weight percent dimethoxyethane based on styrene, at the indicated temperature, employing the initial styrene concentration indicated. Runs were made at 70° C. and at 80° C., and from 3 to 4 styrene increments were employed. The results so obtained are shown in Table I.

TABLE I

| Run No. | No. of styrene increments | Weight[1] percent styrene added | Temp., ° C. | Percent conversion | $n$ | Total weight percent styrene added |
|---|---|---|---|---|---|---|
| 1 | 4 | 15 | 80 | 94.8 | 0.74 | 48 |
| 2 | 4 | 10 | 70 | 98.0 | 0.86 | 35 |
| 3 | 3 | 15 | 70 | | | 15 |
|  |  | 12.5 | 70 | | | 25.6 |
|  |  | 10 | 70 | 95.8 | 1.00 | 33.3 |

[1] Based total reactor content.

Comparison of Runs 2 and 3 indicates that at a given temperature, higher intrinsic viscosity can be achieved when the initial concentration of styrene is above about 15%. In Run 2, employing 10% increments, unduly long induction periods were encountered. In Run 1, which was conducted at somewhat higher temperature, the polymer had a lower intrinsic viscosity, although this run demonstrates that polymer concentrations of as high as 50 weight percent can readily be achieved with good control by the multiple addition technique.

Example 4

In order to demonstrate the deleterious effects of returning refluxing solvent to the reaction system during the polymerization of styrene in solution under reflux reaction conditions, a series of comparative runs was conducted in a number of which refluxing solvent was not returned to the reactor during polymerization. In these runs, 15% by weight styrene in mixed $C_8$ aromatic solvent was polymerized using 0.3 weight percent sodium and 0.15 weight percent dimethoxyethane (based on styrene). In each case, polymerization was effected (a) without return of refluxing solvent (b) with return of refluxing solvent, the condensate being returned at 10° to 20° C. below reaction temperature (c) with return of refluxing solvent, the condensate being returned at 25° to 30° C. below reaction temperature. Runs were made at 65°, 70° and 80° C. Results of these runs are shown in Table II. It will be noted that both low intrinsic viscosity and low conversion were obtained in runs in which condensate was returned compared to runs in which refluxing solvent was withheld for the reactor. The temperature of returned solvent does not appear critical.

TABLE II.—EFFECT OF RETURNING REFLUX

| Run No. | Reaction temp., °C. | Return solvent temp., °C. | Percent conversion | Intrinsic viscosity | APHA color |
|---|---|---|---|---|---|
| 4(a) | 65 | | 98–100 | 1.24 | 1 |
| 4(b) | 65 | 45–55 | 79 | 0.75 | 1 |
| 4(c) | 65 | 35–40 | 72 | 1.1 | 1 |
| 5(a) | 70 | | 98–100 | 1.05 | 1 |
| 5(b) | 70 | 50–60 | 87 | 0.83 | 1 |
| 5(c) | 70 | 40–45 | 87 | 0.81 | 1 |
| 6(a) | 80 | | 98–100 | .96 | 1 |
| 6(b) | 80 | 60–70 | 93 | 0.56 | 1 |
| 6(c) | 80 | 50–55 | 84 | 0.46 | 5 |

Example 5

In order to demonstrate the effectiveness of multiple addition polymerization wherein first and subsequent increments of monomer comprise available solutions of styrene in aromatic hydrocarbon solvent (e.g., styrene-xylene solution produced by partial dehydrogenation of a Udex extracted $C_8$ aromatic hydrocarbon stream), runs were made using multiple-addition polymerization coupled with partial discharge of reactor contents. A 25 weight percent polystyrene-xylene solution was prepared by a two-step multiple addition process following the procedure of Example 2 in a reactor provided with an overhead condenser arranged to avoid reflux of solvent into the reaction system. Sixty percent (60%) of this solution was withdrawn and replaced with an equal weight of 25% styrene in the same aromatic hydrocarbon solvent which was polymerized as hereinbefore described by adding dispersed sodium and dimethoxyethane to make a total of 0.3% sodium and 0.15% dimethoxyethane based on monomer present. Subsequent polymerization steps were made in like manner. The results obtained in two such runs, at 65° C. are shown in Table III. Partial discharge of polymer solution was started one hour after the addition of catalyst in each step. Feedstock in Run 7 was added to the reactor at room temperature and heated to 65° C. prior to the addition of catalyst. In Run 8, feedstock containing 20 p.p.m. Ionol as an oxidation inhibitor was preheated prior to introduction to the reactor. While a slight haze was apparent in this run, undoubtedly due to partial insolubility of the oxidation inhibitor, conversion and intrinsic viscosity of the polymer were excellent, showing this to be an excellent procedure for controlled polymerization of styrene in solution.

TABLE III.—PARTIAL DISCHARGE POLYMERIZATION OF STYRENE

| Increment | Run No. 7 | | | Run No. 8 | | |
|---|---|---|---|---|---|---|
| | n | Percent conversion | APHA color | n | Percent conversion | APHA color |
| 1 | | 92.5 | | 0.93 | 96.6 | Haze |
| 2 | 0.95 | 96.0 | 3 | 0.99 | 95.6 | 1 |
| 3 | 0.97 | 96.0 | 1 | 1.05 | 96.2 | 1 |
| 4 | 1.10 | 97.6 | 3 | 1.03 | 96.8 | 1 |
| 5 | 1.08 | 97.6 | 2 | 1.31 | 93.0 | Haze |
| 6 | 0.97 | 97.2 | 2 | 1.11 | 95.2 | 1 |
| 7 | 1.14 | 96.4 | 1 | 1.30 | 92.1 | 1 |
| 8 | 1.03 | 95.6 | 1 | | | |
| 9 | 0.93 | 90.0 | 1 | | | |
| 10 | 1.16 | 94.8 | 2 | | | |
| 11 | 0.95 | 95.6 | 2 | | | |

While the above examples are limited to specific conditions and proportions, it is contemplated that these factors may be varied considerably to obtain substantially the same results as set forth herein. By the techniques herein described, a polystyrene can be produced with properties equivalent or superior to the properties of commercial styrene polymer heretofore produced.

The present invention constitutes an improvement in the polymerization process described and claimed in United States Letters Patent 2,920,065 of Ralph W. Myerholtz, Jr., and Donald E. Burney, the teachings of which patent are incorporated herein by reference.

We claim:
1. In a process for the polymerization of styrene in solution in an inert hydrocarbon reaction medium wherein the polymerization is effected by means of an alkali metal catalyst and dihydric alcohol dialkylether promoter, the improved method of operation which comprises the steps of
    (1) polymerizing a refluxing solution of about 10 to about 15 weight percent styrene at a temperature between 50° C. and about 100° C. and sub-atmospheric pressure
    (2) adding monomeric styrene to the polymer solution formed in step (1) in an amount sufficient to provide a styrene concentration of at least 10 weight percent and not more than 15 weight percent and effecting polymerization of said added styrene in the presence of a further quantity of said catalyst and promoter
    (3) separating polystyrene from said inert hydrocarbon reaction medium having an intrinsic viscosity (measured in benzene at 30° C.) from about 0.7 to about 1.4.

2. The process of claim 1 wherein the step of adding monomeric styrene and polymerization thereof is effected more than once to obtain a solution containing between about 30 and about 50 weight percent polystyrene.

3. The process of claim 1 wherein said inert hydrocarbon medium is a $C_8$ aromatic hydrocarbon obtained by Udex extraction of a hydrocarbon reformate.

4. Process of claim 1 wherein solvent refluxing during the polymerization is continuously withdrawn from the reaction system.

5. In a process for the polymerization of styrene in solution in an inert hydrocarbon reaction medium wherein the polymerization is effected by means of an alkali metal catalyst and dihydric alcohol dialkylether promoter, the improved method of operation which comprises the steps of
    (1) polymerizing a refluxing solution of about 10 to about 15 weight percent styrene at a temperature between 50° C. and about 100° C. and sub-atmospheric pressure (2) adding monomeric styrene to the polymer solution formed in step (1) in an amount sufficient to provide a styrene concentration between about 10 and about 15 weight percent and effecting polymerization of said added styrene in the presence of a further quantity of said catalyst and promoter (3) separating from about 50 to about 70% of the polymer solution and adding to the remainder thereof an equal weight of a 20–30 weight percent styrene solution in said inert hydrocarbon reaction medium to obtain a styrene-polystyrene solution comprising at least about 15% monomeric styrene (4) effecting polymerization of styrene in said styrene-polystyrene solution as in step (1) and (5) repeating said separation and polymerization steps to provide a reactor effluent comprising a 20–30 weight percent polystyrene solution and separating polystyrene therefrom having an intrinsic viscosity between about 0.7 and about 1.4.

References Cited by the Examiner

UNITED STATES PATENTS

| | | | |
|---|---|---|---|
| 2,658,058 | 11/1953 | Werkema | 260—93.5 |
| 2,920,065 | 1/1960 | Myerholtz et al. | 260—93.5 |
| 3,004,014 | 10/1961 | Myerholtz et al. | 260—93.5 |

JOSEPH L. SCHOFER, *Primary Examiner.*

H. N. BURSTEIN, LEON J. BERCOVITZ, *Examiners.*